United States Patent Office 3,564,685
Patented Feb. 23, 1971

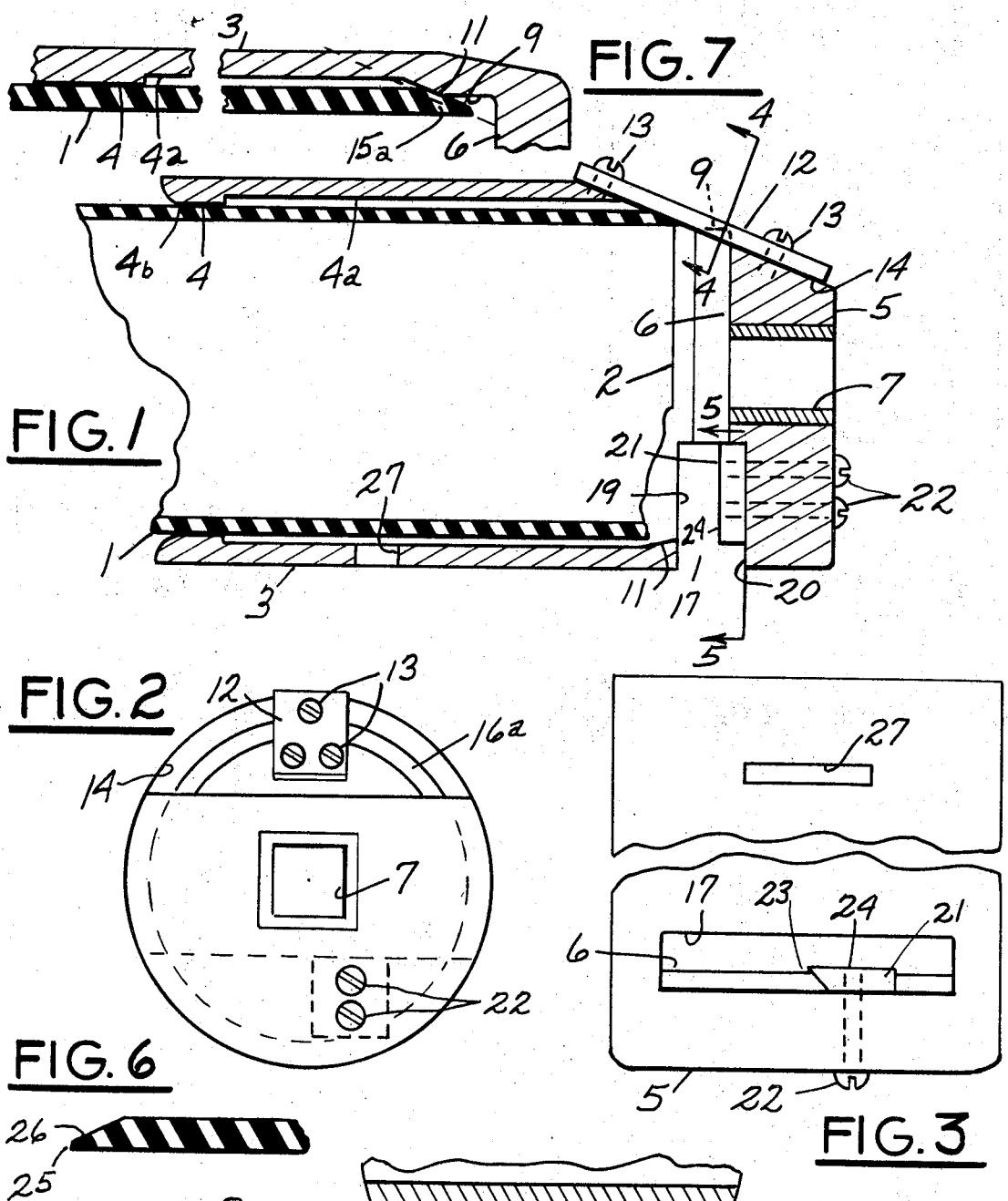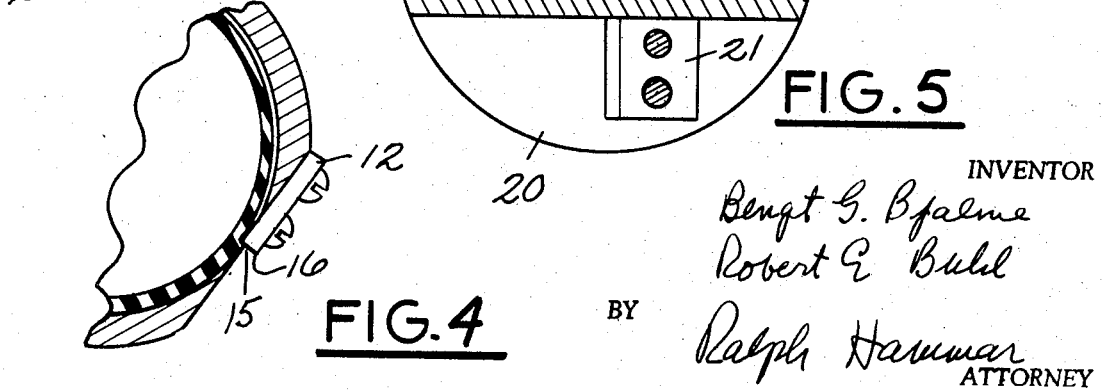

3,564,685
TOOL FOR BEVELLING AND SQUARING PIPE ENDS
Bengt G. Bjalme and Robert E. Buhl, Erie, Pa., assignors to Reed Manufacturing Company, Erie, Pa., a corporation of Pennsylvania
Filed Dec. 13, 1968, Ser. No. 783,524
Int. Cl. B23d *3/22;* B26d *1/12;* B27f *1/08*
U.S. Cl. 29—105                                6 Claims

ABSTRACT OF THE DISCLOSURE

A tool for externally bevelling and squaring the ends of pipe consisting of a body having an elongated bore rotatably and slidably journaled on the outer surface of the pipe and holding the body concentric with the pipe, and bevelling and squaring tools having cutting edges machining the end of pipe by rotating the body relative to the pipe.

---

This invention is a tool for bevelling and squaring the ends of pipe which in a preferred form comprises a cup shaped body with side walls defining a bore having a running and sliding fit on the exterior of the pipe and with the bottom walls providing a stop for the squared end of the pipe. Bevelling and squaring tools have cutting edges projecting controlled distances into the bore and above the bottom wall to control the depth of cut. The tool is operated by relative rotation while exerting a slight axial pressure.

In the drawing, FIG. 1 is a longitudinal section through a pipe and the associated tool for bevelling and squaring the pipe end, FIG. 2 is an end view of the tool, FIG. 3 is a fragmentary side elevation of the tool, FIG. 4 is a section on line 4—4 of FIG. 1, FIG. 5 is a section on line 5—5 of FIG. 1, FIG. 6 is a fragmentary section through a finished end of the pipe, and FIG. 7 is an enlarged section similar to FIG. 1.

In the drawing, 1 indicates a length of rigid vinyl or other plastic pipe having an end 2 which is to be bevelled and squared in preparation for coupling to an adjoining length of pipe. The end 2 is frequently quite rough and may be in worse condition than shown. Before the pipe can be coupled, it is necessary that the end be both bevelled and squared to facilitate its insertion in a rubber ring compression type coupling.

The tool for bevelling and squaring the end of the pipe comprises a cup shaped body 3 of any suitable material such as an aluminum casting having side walls with an elongated bore 4 telescoped over and rotatably and slidably journaled on the exterior of the pipe and having a bottom wall 5 with an inner surface 6 providing a stop to limit the depth of cut to square the end of the pipe. The bore 4 holds the pipe and body concentric while permitting relative rotation and sliding movement. The bore 4 is suitably relieved or enlarged at 4a throughout the major portion of its length so as to provide a short bearing portion 4b at the open or outer end of the body. The relieved portion 4a prevents mud and dirt from scratching or damaging the outer surface of the plastic pipe in this area. In the bottom wall of the pipe is a square socket 7, for example a steel insert, for a square drive ratchet wrench or other driving tool, manual or power.

The body 3 has a running and sliding fit on the pipe and is long enough to hold the body and pipe concentric. Adjacent the bottom wall 5 of the body is a short cylindrical section 9 having at its inside diameter less than the outside diameter of the pipe but not less than the outside diameter of the adjoining finished bevel machined on the pipe. Connecting the cylindrical sections 9 and 4a is a short bevelled section 11 parallel to the taper to be machined on the pipe. When the pipe is first inserted into the body, the rough end 2 strikes the bevel 11 which limits the insertion of the pipe and cooperates with the bearing surface 4b to center the pipe. By limiting the insertion of the pipe, it is not possible to take an excessively deep cut while bevelling the unfinished end.

The bevelling is effected by a bit 12 suitably fastened, for example, by screws 13 to a bevelled surface 14 which is conveniently parallel to the bevel to be machined on the pipe and which projects a slight distance inward of the bevel 11. This provides a control for the thickness of chip removed by the cutting edge 15 of the bit 12 as shown in FIG. 4 and also in FIG. 7 where the plane of the cutting edge is shown by dotted line 15a. For rigid vinyl plastic, the cutting edge 15 is preferably a right angled edge 16 with no rake or clearance. The cutting edge 15 makes a scraping type of cut which is most effective for providing the bevelled end. In FIG. 4 the thickness of the cut has been exaggerated and in FIG. 7 the thickness of cut has been still greater exaggerated. The intersection of the bevel surface 14 with the bore of the cup provides an opening 16a for chip removal.

At the bottom of the body 3 is a transverse slot 17 having sides 19 and 20 in spaced radial planes. The side 20 is sufficiently below the surface 6 so that when a bit 21 is fastened to the bottom of the cutter body, for example by screws 22, its cutting edge 23 projects a controlled distance above the surface 6 as shown in FIG. 3. The cutting edge 23 has a positive rake angle which has proven most effective for producing the squared end of the pipe.

In the use of the tool, the body 3 is telescoped over the end of the pipe and rotated on the pipe by means of a ratchet wrench or other suitable tool inserted in the drive socket 7. During rotation, a slight axial pressure is exerted as a part of the effort required to rotate the body. If the pipe is out of round, it tends to conform to the bore 4 as the body is rotated. The initial cut is the formation of the bevel by the cutting edge 15 which is followed by squaring the bevelled end by the cutting edge 23. The unfinished pipe end strikes the bottom wall 6 and limits the depth of cut by the cutting edge 23. The operation ends with the squared end of the pipe stopped against the flat surface 24 of the bit 21 in a plane perpendicular to the axis of the pipe. No matter what the condition of the pipe end at the start, the operation ends with a square end surface 25 and an exterior bevel 26 as shown in FIG. 6.

When the operation is finished, it is desirable to mark a pipe a fixed distance from the finished end to indicate the extent to which the pipe should be inserted into a coupling. For this purpose, the side walls of the body are provided with a slot 27 for receiving a marking crayon. The pipe will be marked at the end of the operation when the mark will indicate the fixed distance from the squared end surface 25.

What is claimed is:

1. A tool for externally bevelling a pipe end comprising a body having an elongated bore adapted to be telescoped over and to be rotatably and slidably journaled on the outer surface of a pipe end, a bit mounted on the body having a cutting edge intersecting the bore at the bevel angle and projecting into the bore a distance to provide the desired depth of cut, said bore having a short cylindrical section at its inner end of inside diameter less than the outside diameter of the pipe but not less than the adjoining finished bevel section of the pipe, and a bevel section extending outward from said short cylindrical section.

2. A tool for externally bevelling a pipe end comprising a body having an elongated bore adapted to be telescoped over and to be rotatably and slidably journaled on the outer surface of a pipe end, a bit mounted on the body having a cutting edge intersecting the bore at the bevel angle and projecting into the bore a distance to provide the desired depth of cut, said bore having an inwardly extending stop means in the bore having an inside diameter less than the outside diameter of an unbevelled pipe end but not less than the outside diameter of a bevelled pipe end for limiting the insertion of an unbevelled pipe end.

3. The tool of claim 2 in which the body is cup shaped and has a bottom wall and a cutting edge projecting above said bottom wall for squaring the end of the pipe.

4. A tool for externally bevelling a pipe end comprising a body having an elongated bore adapted to be telescoped over and to be rotatably and slidably journaled on the outer surface of a pipe end, said bore cooperating with said outer surface to hold the body concentric with the pipe end during relative rotation therebetween, a bit mounted on the body having a cutting edge intersecting the bore at the bevel angle and projecting into the bore a distance to provide the desired depth of cut, said body being cup shaped and having a bottom wall and a cutting edge projecting above said bottom wall for squaring the end of the pipe, said body having a transverse slot with one side of the slot spaced above the bottom wall and the other side of the slot spaced below the bottom wall and the cutting edge for squaring the end of the pipe is provided by a bit mounted on said other side of the slot and having a cutting edge projecting above the bottom wall.

5. The tool of claim 3 in which the bit has a flat surface cooperating with the finished squared end to provide a stop limiting the insertion of the pipe end into the body.

6. The tool of claim 3 in which the cutting edge has a stop surface cooperating with the finished squared end of the pipe.

References Cited

UNITED STATES PATENTS

| | | | |
|---|---|---|---|
| 404,113 | 5/1889 | Rogers | 144—206 |
| 433,615 | 8/1890 | Brown | 29—103 |
| 661,554 | 11/1900 | Roberts | 29—103 |
| 2,204,516 | 6/1940 | Stone | 29—103 |
| 2,218,147 | 10/1940 | Greenwood | 82—4 |
| 2,807,297 | 9/1957 | Lucas | 144—205 |
| 3,142,139 | 7/1964 | Mangum | 82—4X |
| 3,157,076 | 11/1964 | Arthur | 82—4 |

FOREIGN PATENTS

| | | |
|---|---|---|
| 890,815 | 3/1962 | Great Britain. |
| 715,297 | 8/1965 | Canada. |

HARRISON L. HINSON, Primary Examiner

U.S. Cl. X.R.

82—4; 144—205